(12) United States Patent
Ross (10) Patent No.: US 9,973,799 B2
(45) Date of Patent: *May 15, 2018

(54) VIDEO ON DEMAND ACCESS BY MULTIPLE DEVICES

(71) Applicant: MEDIACOM COMMUNICATIONS CORPORATION, Middletown, NY (US)

(72) Inventor: Joseph Thomas Ross, Stevensville, PA (US)

(73) Assignee: Mediacom Communications Corporation, Middletown, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 14/947,715

(22) Filed: Nov. 20, 2015

(65) Prior Publication Data

US 2016/0080787 A1 Mar. 17, 2016

Related U.S. Application Data

(63) Continuation of application No. 13/916,217, filed on Jun. 12, 2013, now Pat. No. 9,197,919.

(51) Int. Cl.

| | |
|---|---|
| *H04N 21/258* | (2011.01) |
| *H04N 21/4405* | (2011.01) |
| *H04N 21/222* | (2011.01) |
| *H04N 21/658* | (2011.01) |
| *H04N 21/643* | (2011.01) |
| *H04N 21/4402* | (2011.01) |
| *H04N 21/436* | (2011.01) |
| *H04N 21/426* | (2011.01) |
| *H04N 21/418* | (2011.01) |
| *H04N 21/21* | (2011.01) |

(52) U.S. Cl.
CPC ....... *H04N 21/25816* (2013.01); *H04N 21/21* (2013.01); *H04N 21/2221* (2013.01); *H04N 21/418* (2013.01); *H04N 21/42684* (2013.01); *H04N 21/43615* (2013.01); *H04N 21/4405* (2013.01); *H04N 21/440218* (2013.01); *H04N 21/64322* (2013.01); *H04N 21/6581* (2013.01)

(58) Field of Classification Search
CPC ......... H04N 21/25816; H04N 21/4405; H04N 21/2221; H04N 21/42684; H04N 21/43615; H04N 21/64322; H04N 21/6581; H04N 21/440218; H04N 21/418; H04N 21/21
See application file for complete search history.

(56) References Cited

U.S. PATENT DOCUMENTS

| | | |
|---|---|---|
| 7,900,234 B2 | 3/2011 | Chun |
| 8,006,282 B2 | 8/2011 | Sankaran et al. |
| 2007/0180484 A1 | 8/2007 | Siripunkaw et al. |

(Continued)

*Primary Examiner* — Hai V Tran
*Assistant Examiner* — Aklil M Tesfaye
(74) *Attorney, Agent, or Firm* — Dorsey & Whitney LLP (57) ABSTRACT

A system and method for streaming a Video on Demand (VOD) asset includes receiving, at a host, a VOD asset request from a client over an internal network, and sending the VOD asset request from the host over an external network using a client/host address that includes a host address and a client address. The VOD asset targeted for the client including the client/host address is received at the host over the external network, and the VOD asset is streamed from the host to the client over the internal network.

21 Claims, 5 Drawing Sheets

(56) References Cited

U.S. PATENT DOCUMENTS

| | | |
|---|---|---|
| 2007/0220565 A1 | 9/2007 | Angel et al. |
| 2008/0129864 A1 | 6/2008 | Stone et al. |
| 2008/0177998 A1 | 7/2008 | Apsangi et al. |
| 2008/0178252 A1 | 7/2008 | Michaud |
| 2008/0271096 A1 | 10/2008 | Gazier et al. |
| 2009/0028134 A1 | 1/2009 | Reuss |
| 2009/0187939 A1 | 7/2009 | Lajoie |
| 2010/0169940 A1 | 7/2010 | Howarter et al. |
| 2010/0235869 A1* | 9/2010 | Zhao ................. G06F 21/10 725/82 |
| 2010/0319038 A1* | 12/2010 | Devassykutty .... H04N 7/17318 725/82 |
| 2011/0072088 A1 | 3/2011 | Kiyohara |
| 2011/0107404 A1 | 5/2011 | Ramsdell et al. |
| 2011/0182278 A1 | 7/2011 | Tsai |
| 2012/0131603 A1 | 5/2012 | Williamson et al. |
| 2012/0155395 A1 | 6/2012 | Yadav et al. |
| 2012/0173746 A1 | 7/2012 | Salinger et al. |
| 2012/0287856 A1 | 11/2012 | Ketchum et al. |
| 2013/0145406 A1 | 6/2013 | Baskaran et al. |
| 2014/0157298 A1* | 6/2014 | Murphy ........... H04N 21/64322 725/14 |
| 2014/0189067 A1 | 7/2014 | Gratton et al. |
| 2014/0250471 A1* | 9/2014 | Guerra ............. H04N 21/43615 725/82 |

* cited by examiner

VIDEO ON DEMAND ACCESS BY MULTIPLE DEVICES

CROSS-REFERENCE TO RELATED APPLICATION

This application is a Continuation of U.S. Pat. No. 9,198,919 (application Ser. No. 13/916,217), filed Jun. 12, 2013 and published as U.S. Patent Publication No. 2014/0373078, entitled "Video on Demand Using Combined Host and Client Addressing." The entirety of which is hereby incorporated by reference herein.

FIELD

The present disclosure generally relates to methods and systems for streaming video on demand (VOD) to a client using a combined host and client address, such as to deliver VOD content to a set top box (STB) in a home cable system.

BACKGROUND

In traditional home cable systems, a variety of STBs (e.g., a standard STB, a digital video recorder (DVR), etc.) have been setup such that each STB is connected to an individual television. Each STB operates independently (e.g., without the need for other equipment located at the house). For example, typically, each STB has a television, cable or RF tuner that can tune to a particular channel that a user wishes to watch. Each STB decodes an incoming television, cable or RF signal and has its own CableCARD. Individual VOD assets are streamed directly to the STB.

In some satellite television systems, whole-home DVR/television systems have been implemented that allow each STB to communicate with the main provider server, and also allow the STBs in a home to communicate with each other. For example, content recorded on a DVR can be shared across multiple STBs. Additionally, a single main STB has been used that contains numerous tuners that are shared with numerous non-addressable client emulator STBs In such a system, each satellite STB communicates with the main STB to use one of the tuners available at the main STB or watch content stored on the main STB. In such a system, for each satellite STB to receive VOD content, the satellite STB must make a request of the main STB, which downloads the VOD asset to a DVR on the main STB, and then streams the VOD asset to the satellite STB.

What is desired is improved VOD asset distribution to clients.

SUMMARY

In an embodiment, a method for streaming a VOD asset can include receiving, at a host, a VOD asset request from a client over an internal network, and sending the VOD asset request from the host over an external network using a client/host address that includes a host address and a client address. The VOD asset targeted for the client can be received at the host over the external network, and can include the client/host address. The VOD asset can be streamed from the host to the client over the internal network. The internal network can use a different network protocol than the external network, such as an Ethernet to physical RF protocol (e.g., MOCA). The VOD asset can be received at the host in a first format, and streamed to the client in a second format, for example, by the host transcoding the VOD asset from the first format to the second format.

The VOD asset request can be received from the host at the head end, and verification can be performed to determine if the client is authorized to view the VOD asset. The host can receive an address request from the client, and assign a client address to the client. The host address can be a media access control address, and the client address can be at least a 3-bit address. The client/host address can include the host address having the client address concatenated thereto. The VOD asset request can be sent over the external network using an out-of-band frequency, and at received the host over an in-band frequency. A location of an in-band frequency can be received at the host, and the host can tune a tuner to the in-band frequency.

In an embodiment, a method for transmitting a VOD asset can include receiving a VOD asset request, at a host, from a client over an internal network, and sending the VOD asset request using an out-of-band frequency, from the host over an external network, using a client/host address that includes a host address and a client address. The VOD asset can be streamed from the host to the client.

In an embodiment, a method for streaming a VOD asset can include receiving, at a head end from a host over an out-of-band frequency, a VOD asset request including a client/host address that includes a host address and a client address, sending, from the head end to a VOD server, the VOD asset request including the client/host address, receiving, at the head end from the VOD server, an in-band frequency location of the VOD asset, and sending, from the head end to the host over the out-of-band frequency, the in-band frequency location of the VOD asset.

In an embodiment, a system for streaming a VOD asset can include a host configured to communicate over an internal network and an external network, and a client configured to communicate over the internal network, the client having a client address assigned by the host. The host can be further configured to request and receive the VOD asset over the external network using a host address and the client address, and send the received VOD asset to the client over the internal network.

In one embodiment, a method for accessing video on demand content by one or more client devices is disclosed. The method includes receiving by the host an access request for video on demand content from a client device over an internal network, transmitting by the host on behalf of the client device, the access request to a head end over an external network, receiving by the host from the end access to the video on demand content over the external network, decoding the video on demand content by the host using a decoder authorized by the end, and transmitting by the host the decoded view on demand content to the client device over the internal network.

In another embodiment, a system for accessing content is disclosed herein. The system includes a host device comprising a communication device in communication with a head end through an external network and a client device in communication with the host device through an internal network. The client device is adapted to receive a user request to access content and transmit a request for access to a content asset to the host device in response to the user request. Additionally, the client device is in communication with a display for displaying the content asset. In the system, the host device is further adapted to request access to the content asset from the head end on behalf of the client device in response to receiving the request for access from the client device, the host device being adapted to access the content asset over the external network using the communication device and stream the content asset to the client device through the internal network for displaying on the display in response to approval to the request to access the content.

In yet another embodiment, a method for accessing one or more video on demand assets is disclosed. The method includes receiving by a host device a request to access a video on demand asset from a client device unable to access the video on demand asset directly; transmitting by the host device an access request for the video on demand asset to a head end, wherein the access request includes a combination address including a host device address and a client device address; receiving by the host device from the head end a location of the video on demand asset; and transmitting by the host device the video on demand asset to the client device.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with paragraphs particularly pointing out and distinctly claiming the subject matter that is regarded as forming the present invention, it is believed that the disclosure will be better understood from the following description taken in conjunction with the accompanying figures, in which:

DETAILED DESCRIPTION

Figure 1:
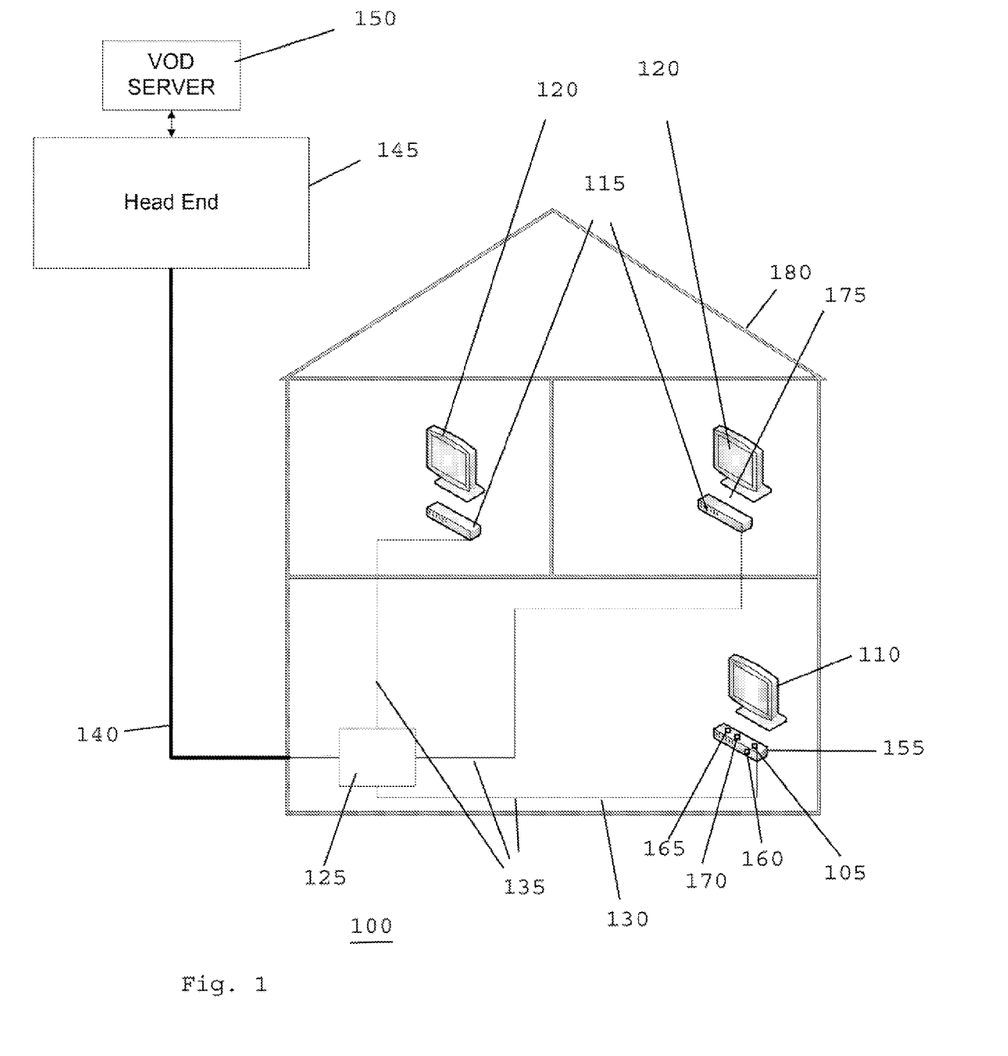
FIG. 1 is a schematic view of a whole-home cable system according to an exemplary embodiment of the present disclosure.

Referring to FIG. 1, a cable system 100 is depicted, which is an example of a whole-home cable system configured to stream a VOD asset to a client STB, preferably without the need for the client STB to have a CableCARD. Cable system 100 can be installed or hooked up in a single residence (e.g., single-family house, condominium, apartment etc.). Cable system 100 can have a host 105, which can be provided on a properly configured server, and is preferably connected within cable system 100 as a headless gateway, which can communicate over an internal network and an external network. Host 105, can be connected or coupled to a Television (TV), monitor, or other display device 110. Alternatively, host 105 need not be connected with a direct output to TV 100, and host 105 can be remotely accessible, for example, by client 115. Host 105 can include, or alternatively, can be coupled to, one or more tuners 155 that are configured to tune to a particular channel. The tuned channel can be displayed on TV 110, or the signal, such as a VOD asset or other television program, can be stored for later playback. For example, host 105 can have four or another number of tuners, each tuner being separately capable of tuning to a particular channel. Host 105 can also include, or be coupled to, a storage device 165 capable of recording television content (e.g., host 105 can include a DVR). Storage device 165 can be of any suitable size (e.g., 100 GB, 250 GB, 500 GB, 1 terabyte (TB) etc.). Content from each tuner, in standard definition (SD), high definition (HD), and/or any other suitable video resolution, can be separately, and simultaneously, recorded onto storage device 165.

Host 105 can also include an external communication device, such as CableCARD 160 or other suitable communication device to enable communicating with the head end 145, which can be removably coupled to host 105, or can be embedded inside of host 105, without the capability of being removed. CableCARD 160 can facilitate host 105 to be able to view, and/or record, digital content that may be broadcast over the tuner. Additionally, CableCARD 160 can facilitate host 105 to be able to communicate with a cable system head end 145 and/or VOD server 150. VOD server 150 can be located at or near head end 145 (e.g., it can be stored and maintained by head end 145). Alternatively, the VOD server can be located "off-site" from the head end 145, and can communicate over a further external network with head end 145.

Host 105 in cable system 100 has a host address (e.g., address 505 of FIG. 5), such as a media access control (MAC) address, that identifies the host 105, and is preferably a unique identifier assigned to host 105. The MAC address can facilitate communication over external network 140, which can be an RF cable network, a fiber optic network, a wireless network, or any other suitable network. The MAC address can be assignable based on CableCARD 160, for example. Alternatively, host 105 can have a network interface 170, which can have a unique MAC address. Other suitable ways of assigning a MAC address or identifying the host can alternatively be used. Additionally, host 105 can communicate with head end 145 and/or VOD server 150 using another suitable connection standard (e.g., a dynamic or static Internet Protocol (IP) address etc.). Host 105 in this embodiment communicates with head end 145 and VOD server 150 using both in-band and out-of-band frequencies, although. An in-band frequency can be frequencies used to transmit and receive the audio/video, multimedia, and data content from a head end 145 and/or VOD server 150, with out-of-band frequencies being in a frequency band that is separate from the audio/video, multimedia, and data content. In one example, the in-band frequencies can be between 55 MHz to 1002 MHz, and the out-of-band frequencies can be between 8 MHz to 42 MHz.

Host 105 can be directly connected to external network 140. Alternatively, as shown in FIG. 1, host 105 can be connected to a splitter, such as a Radio Frequency (RF) splitter 125 or other type of connection or signal splitter over an internal network 135, which can utilize Coaxial Cable. RF splitter 125 is shown connected to external network 140 so that host 105 can communicate with the head end 145 through RF splitter 125.

Cable system 100 can have one or more clients 115, with some or all clients 115 being capable of connecting to TV 120 or other suitable display. Clients 115 can be provided with or without their own tuner, storage, or CableCARD (e.g., each client 115 does not need a MAC address or other unique identifier pre-assigned by a cable company or device manufacturer); although in alternative embodiments some or all of the clients are provided with one or more of there. Clients 115 can be connected to each other, and to host 105, through RF splitter 125, over internal network 135 using Coaxial Cable 130 and a modulation procedure that can modify Ethernet to be transmitted over an RF physical transport. Such a procedure can include a Multimedia over Coax Alliance (MoCA) connection or other suitable connection or protocol that preferably allows data and video asset transmittal. The MoCA connection can allow both data communication and the transfer of audio and video streams. A MoCA Ethernet bridge, which can be coupled to each client 115 and host 105, can be used to supply network and multimedia connectivity to client 115. Alternatively, clients 115 can connect to host 105 using any other suitable connection medium, wired or wireless (e.g., Ethernet, fiber optic or 802.11xx).

As clients 115 of cable system 100 do not have a tuner, clients 115 cannot themselves tune to a particular channel to be watched. Additionally, in some embodiments, clients 115 can have limited or no storage capability, in which case such clients 115 would not be able to store content. For clients 115 to watch a particular channel, each client 115 can "borrow" a tuner available at host 105. For example, if host 105 has four tuners, four tuners can be separately available to be used at host 105 or at any of the clients 115. If no tuners are available, then a client can "piggy back" on a tuner currently being used by host 105 or by another client 115 (e.g., a client can watch the content on any tuner already in use). Clients 115 can preferably stream content that has been recorded on host 105 and can control some of the functionality of host 105 (e.g., a client 115 can request a particular show be recorded at host 105). While in an alternative embodiment, clients 115 have the ability to connect directly to the head end 145, the clients 115 in exemplary cable system 100, however, cannot directly communicate with head end 145 and/or VOD server 150. As such, clients 115 cannot directly stream a VOD asset from VOD server 150 as in the case of a standard STB having its own CableCARD. In order for client 115 to request and stream a VOD asset from a VOD server, client 115 has to make a request of host 105, which on the client's behalf, can request and stream a VOD asset. Host 105 can receive, or tune to, the VOD asset over external network 140, and can transcode (e.g., a direct digital-to-digital data conversion of one encoding format to another) and stream the VOD asset to client 115 over internal network 135.

A VOD asset can include a digital rights management (DRM) video asset that has back office billing integration, for example, with a multiple system operator such as a cable company. The VOD asset can include encryption security of the asset, and can provide for trick play modes without the use of a local hard drive (e.g., a mode that mimics the visual feedback given during fast-forward and rewind operations that were previously provided by analogue systems such as VCRs by manipulating the digital video stream to include only a subset of frames).

While the above example illustrates cable system 100 being set up in a single-family residence (e.g., both host 105 and client 115 are all located at a single residence), the above system can also be used in a multi-family residence (e.g., a condominium building or an apartment building) or in another type of residential or commercial building(s). For example, host 105 can be connected and operate as a host for more than one single residence or commercial spaces, and can have enough tuners to accommodate the number of residences or television sets in the building(s) (e.g., host 105 can have one or more tuners dedicated to each residence). Each residence can have one or more clients 115 that are capable of communicating with any client in the same residence or with host 105. In some embodiments, clients 115 in one residence cannot communicate with clients 115 in another residence, while the clients 115 in both residences communicate with the same host 105.

Figure 5:
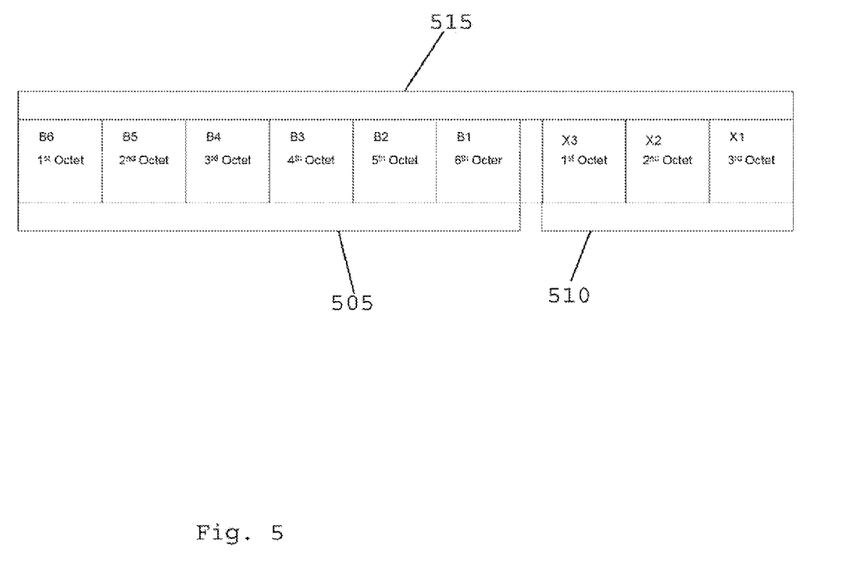
FIG. 5 is a schematic representation of a client/host address according to an exemplary embodiment of the present disclosure.

In cable system 100, in which clients 115 do not have their own CableCARD or an internal mechanism for external communication over external network 140, clients 115 can only communicate with host 105 over internal network 135. For host 105 to differentiate one client from another, each client needs to be assigned a client address. Client address 510 can be assigned by host 105. Alternatively, client address 510 can be pre-assigned (e.g., assigned prior to client 115 being setup). Client address 510 can be a 24-bit address (e.g., composed of three 8-bit frames). Alternatively, client address 510 can be composed of more or less than 24 bits (e.g., 3 bits, 4 bits, 8 bits, 32 bits etc.). In order for host 105 to request a VOD asset on behalf of client 115, host 105 can use a combined client/host address 515, which can include both the host address 505 and the client address 510. The client/host address 515 can include separate designations for each address (e.g., an identifiable block for host address 505 and an identifiable block for client address 510). Alternatively, client address 510 can be appended or concatenated onto host address 505. Typically, the client address 510 is appended to the host address 505 in the combined host/client address 515 although other manners of combining the host address 505 and client address 510 can be employed.

Figure 2:
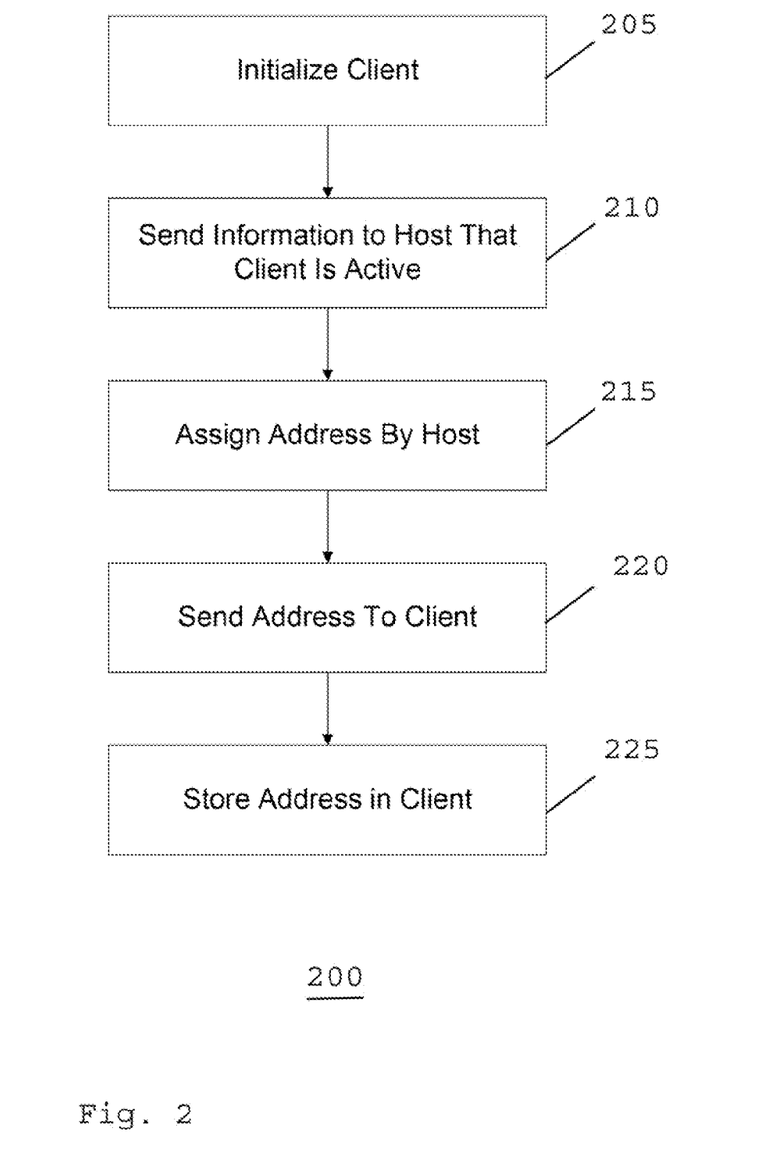
FIG. 2 depicts a flow chart illustrating steps of assigning an address to a client.

As depicted in FIG. 2, a method 200 for assigning an address to a client is shown. In an embodiment of the method, a client 115 can be initialized at step 205. A client can be automatically initialized upon powering up (e.g., client 115 can automatically initiate a request for a client address once it has been powered on for the first time). Alternatively, client 115 can be initialized upon, and in some instances only upon, a direct request from a user (e.g., the user initiates the client address request) or after another event or events take place. After client 115 is initialized at step 205, client 115 can send information to host 105, over internal network 135, at step 210. Once host 105 receives information about a newly active client 115, host 105 can assign an internal client address (e.g., Address 510 of FIG. 5) to client 115 at step 215. Client address 510 can be any suitable number of bits (e.g., in order to provide enough addresses to differentiate one client from another client). In one example, client address 510 can be composed of 24 bits. The use of 24 bits can facilitate a standardization that can be used by all manufacturers, head ends and VOD servers. In some embodiments, the group bits containing the client address can also include other information.

Once host 105 assigns a client address 510, host 105 can send client address 510 to client 115, over internal network 135, at step 220. At step 225, client 115 stores client address 510. Client 115 can store client address 510 in volatile or non-volatile Memory 175. In cases where only volatile memory is used, client address 510 may be lost if client 115 loses power. Therefore, in some embodiments, after each power loss and subsequent power-on, client 115 requests a new client address. In cases where non-volatile memory is used, client address 510 can be stored in the non-volatile Memory 175, which would maintain storage of client address 510 even during a power outage. However, client 115 can be configured in some embodiments to request a new client address, even if a client address has already been assigned, when the power loss exceeds a particular amount of time (e.g., greater than 1 day, greater than 1 week etc.).

Figure 3:
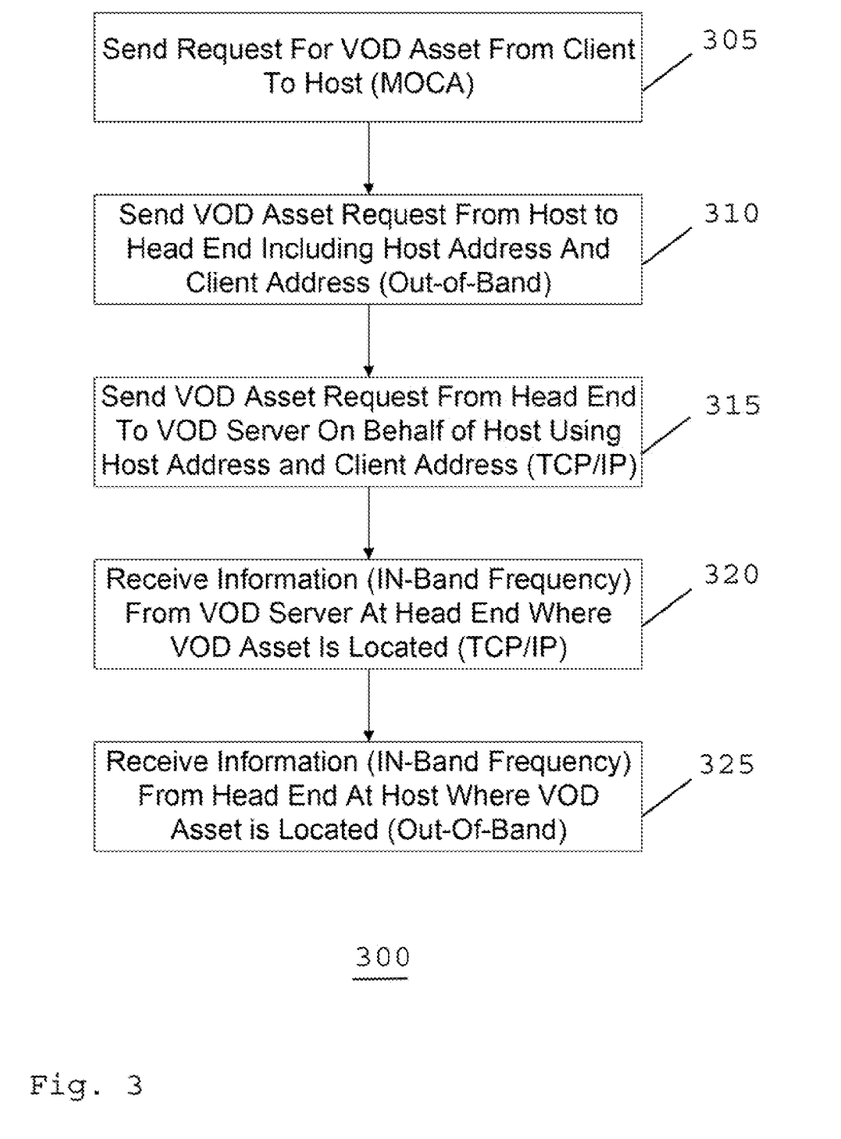
FIG. 3 depicts a flow chart illustrating steps of requesting a VOD asset.

Once a client 115 has been initialized, it can communicate with host 105 to borrow a tuner coupled to host 105, or to stream content stored on host 105. Client 115 can also request a VOD asset from host 105. As depicted in FIG. 3, a method 300 for requesting a VOD asset is shown. At step 305, client 115 can send a VOD asset request to host 105 over internal network 135 (e.g., using MoCA). Host 105 can verify that client 115 can access the requested content (e.g., host 105 can have a list of content that client 115 is authorized and not authorized to view). For example, clients 115 can be locked (e.g., child locked) to prevent certain content from being viewed on certain clients.

Host 105 can receive the request and, at step 310, send the VOD asset request to head end 145 over external network 140 using a combined host/client address 515, which includes a combination of host address 505 and client address 510. Host 105 can send the VOD asset request, along with the combined host/client address client/host address 515, using an out-of-band signal, or any other suitable communication mechanism After head end 145 receives the VOD asset request, head end 145 can verify that host 105 and client 115 are authorized to access the particular VOD asset, and upon authorization, head end 145 can send the VOD asset request, including client/host address 515 to VOD server 150, over TCP/IP or other suitable communication mechanism, at step 315. The VOD server can receive the request, and then, at step 320, head end 145 can receive from VOD server 150, over TCP/IP or other suitable communication mechanism, the In-Band frequency where the VOD asset is located. At step 325, host 105 can receive from head end 145, over an out-of-band frequency, the in-band frequency location of the VOD asset.

Figure 4:
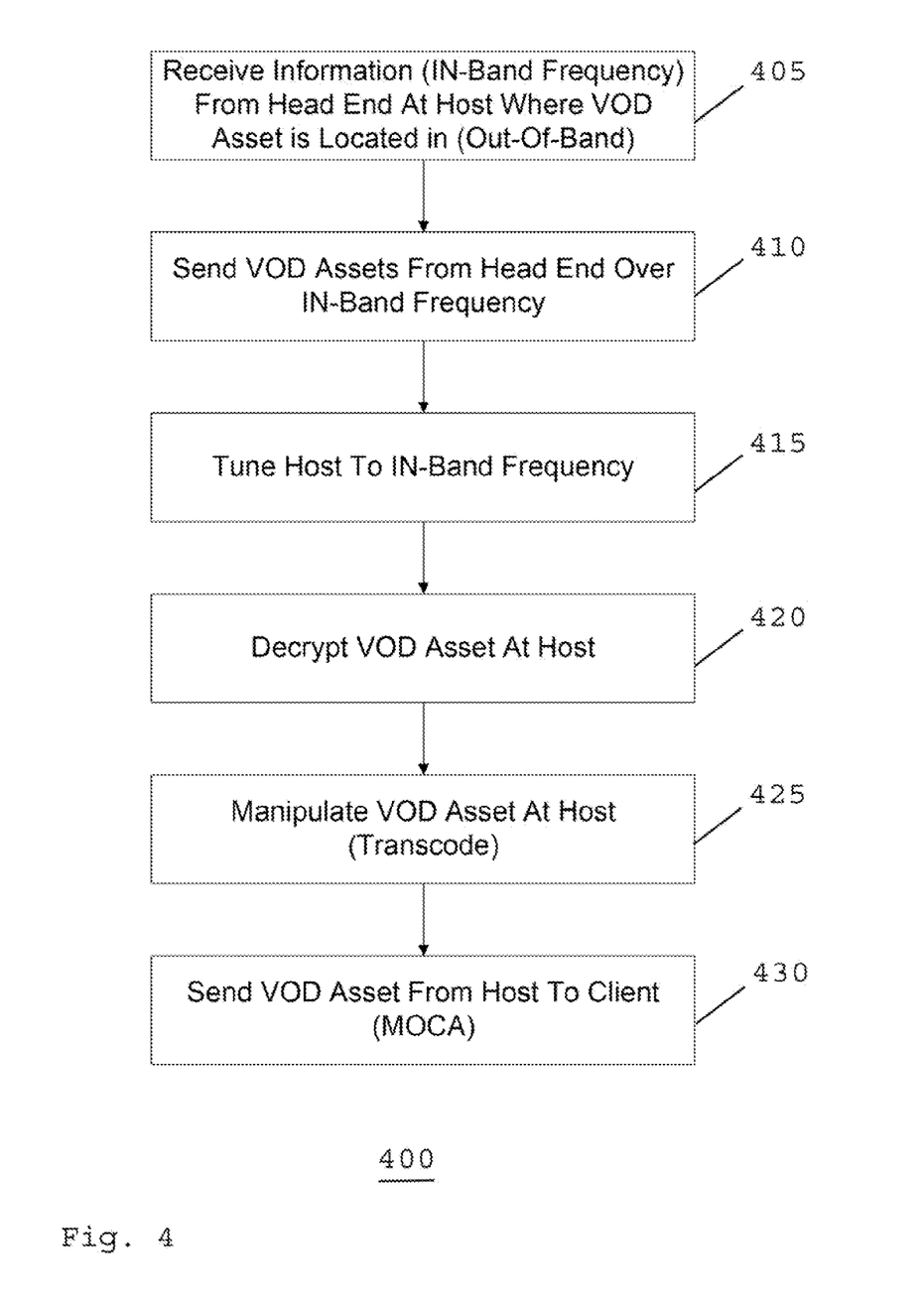
FIG. 4 depicts a flow chart illustrating steps of streaming a VOD asset to a client.

Once the in-band frequency location of the VOD asset is received (e.g., step 405 of FIG. 4), the VOD asset can be streamed to client 115. As depicted in FIG. 4, a method of streaming a VOD asset to a client is shown. At step 410, the VOD asset is sent over the particular in-band frequency either from head end 145 or from VOD server 150. At step 415, host 105 tunes one of the available Tuner 155 to the particular in-band frequency. At step 420, host 105 can decode the VOD asset, (e.g., using the CableCARD 160), and the VOD asset can be manipulated at step 425. For example, host 105 can transcode the VOD asset from a 13818 MPEG-2, which is streamed from VOD server 150, by first performing an RF demodulation, and passing the VOD asset to a CableCARD decoder for decryption of the asset. Then the transcoding procedure can be performed by, for example, compressing the video into a different format (e.g., into H.264 (MPEG-4). The transcoding process can optionally be performed in real-time, which negates the need for host 105 to store the VOD asset. During the transcoding process, any already transcoded portion of the video can be sent to client 115 to be viewed, such as over MoCA or other suitable medium, while the rest of the video is being transcoded. For example, once a particular amount of the video has been transcoded (e.g., 15 seconds, 30 seconds, 1 minute etc.), host 105 can begin sending the portion that has been transcoded to client 115. Host 105 can continuously transcode the remaining portion of the VOD asset and send any transcoded portion to client 115 to be viewed.

In cable system 100, each client 115 can have the same functionality of a standard STB without the need for its own tuner and/or CableCARD. Each client 115 can communicate directly with host 105, and host 105 can request, receive, transcode, and send a VOD asset to client 115, either incorporating a storage device or without the need for storage coupled to host 105 or client 115. As such, cable system 100 would not violate content deals with VOD content providers that do not allow for the storage of a VOD asset, and only allow for streaming of the VOD asset directly to the requesting client 115.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety.

What is claimed is:

1. A method for accessing video on demand content by one or more client devices, comprising:
receiving by a host an access request for video on demand content from a client device over an internal network;
transmitting by the host on behalf of the client device the access request to a head end over an external network, wherein the access request comprises transmitting by the host a combined address to the head end, wherein the combined address includes a client address specific to the client device and a host address specific to the host, wherein the client address is distinct from the host address;

receiving by the host from the head end access to the video on demand content over the external network;

decoding the video on demand content by the host using a decoder authorized by the head end; and transmitting by the host the decoded video on demand content to the client device over the internal network.

2. The method of claim 1, wherein the client device is unable to decode the content and is unable to communicate independently over the external network.

3. The method of claim 1, wherein the decoder comprises a communication device authorized by the head end.

4. The method of claim 1, wherein receiving access to the video on demand content comprises:

receiving by the host a frequency location of the video on demand content from the head end; and tuning by the host, a tuner to the frequency location.

5. The method of claim 1, wherein the host address is a media access control address.

6. The method of claim 1, further comprising verifying by the host that the client device is authorized to access the content.

7. The method of claim 1, wherein the client address is assigned by the host.

8. The method of claim 1, wherein in the combined address, the client address is appended to the host address.

9. The method of claim 1, wherein the combined address is used by the head end to verify that both the host and the client device are authorized to access the video on demand content.

10. A system for accessing content, comprising:

a host device comprising a communication device in communication with a head end through an external network; and a client device in communication with the host device through an internal network and adapted to receive a user request to access content and transmit a request for access to a content asset to the host device in response to the user request, wherein the client device is in communication with a display for displaying the content asset, wherein the request access of the host device to the head end comprises transmitting a combined address to the head end, wherein the combined address includes a host address identifying the host device and a client device identifying the client device;

wherein the host device is adapted to request access to the content asset from the head end on behalf of the client device in response to receiving the request for access from the client device, the host device being adapted to access the content asset over the external network using the communication device and stream the content asset to the client device through the internal network for displaying on the display in response to approval to the request to access the content.

11. The system of claim 10, wherein the combined address is used by the head end to verify that both the host device and the client device are authorized to access the video on demand content.

12. The system of claim 10, wherein the communication device is a Cable Card and is adapted to decode the content from the head end.

13. A method for accessing one or more video on demand assets, comprising:

receiving by a host device a request to access a video on demand asset from a client device unable to access the video on demand asset directly;

transmitting by the host device an access request for the video on demand asset to a head end, wherein the access request includes a combination address including a host device address and a client device address, wherein the host device address is specific to the host device and the client device address is specific to the client device;

receiving by the host device from the head end a location of the video on demand asset; and transmitting by the host device the video on demand asset to the client device.

14. The method of claim 13, further comprising transcoding by the host device the video on demand asset from a first format into a second format.

15. The method of claim 13, wherein:

the host device communicates with the client device over an internal network;

the host device communicates with the head end over an external network; and the client device is incapable of communicating over the external network.

16. The method of claim 13, further comprising assigning by the host device, the client address, wherein the client address is used by the head end to ensure the host device and the client device are authorized to access the video on demand asset.

17. The method of claim 16, wherein prior to transmitting the access request for the video on demand asset, the host device verifies that the client device is authorized to access the video on demand asset.

18. The method of claim 13, wherein the host device transmits the access request using an out-of-band frequency over the external network; and the host device receives the location of the video on demand asset using an in-band frequency over the external network.

19. The method of claim 18, wherein the location of the video on demand asset corresponds to an in-band frequency location of the video on demand asset.

20. The method of claim 19, further comprising:

tuning by the host device a tuner to the in-band frequency location of the video on demand asset; and decoding by the host device the video on demand asset.

21. The method of claim 13, wherein the host address comprises a media access control address and the host device assigns the client address to the client device.

* * * * *